United States Patent [19]

Dancy et al.

[11] 4,082,863
[45] Apr. 4, 1978

[54] FABRICATION OF CERAMIC HEAT PIPES

[75] Inventors: Edna A. Dancy, Beaconsfield; James H. Vansant, Chambly, both of Canada

[73] Assignee: Hydro-Quebec, Canada

[21] Appl. No.: 727,707

[22] Filed: Sep. 29, 1976

[30] Foreign Application Priority Data

Sep. 28, 1976 Canada ............................ 262251

[51] Int. Cl.$^2$ ................ B05D 7/22; B05D 1/36; B05D 3/02
[52] U.S. Cl. .................................. 427/181; 138/145; 138/146; 165/105; 165/133; 427/202; 427/204; 427/205; 427/230; 427/235; 427/376 A; 428/36
[58] Field of Search ............... 428/35, 36, 304, 308, 428/450, 469, 539; 427/193, 201, 202, 203, 204, 205, 376 A, 376 C, 376 D, 181, 230, 235, 239; 138/145, 146, 177; 62/119, 56; 165/105, 133

[56] References Cited

U.S. PATENT DOCUMENTS

| 2,149,133 | 2/1939 | Cohn ................................ 428/36 X |
| 2,337,691 | 12/1943 | Stettinius et al. ................ 427/193 |
| 2,350,348 | 6/1944 | Gaugler ............................. 62/19 |
| 2,668,783 | 2/1954 | Migley ........................ 427/376 A X |
| 3,278,324 | 10/1966 | Nelson ........................... 427/193 X |
| 3,399,078 | 8/1968 | Bang ................................ 428/450 |
| 3,476,584 | 11/1969 | Randklev et al. ............. 427/376 X |
| 3,539,387 | 11/1970 | Kelly et al. .................... 428/539 X |
| 3,560,236 | 2/1971 | Orth ................................ 427/376 X |
| 3,939,295 | 2/1976 | Robertson et al. ........... 427/376 C X |
| 3,975,165 | 8/1976 | Elbert et al. .................... 428/472 X |

Primary Examiner—Harry J. Gwinnell
Assistant Examiner—Shrive P. Beck
Attorney, Agent, or Firm—Bacon & Thomas

[57] ABSTRACT

A method of forming a porous capillary layer of a metal oxide ceramic material onto a metal oxide ceramic substrate, which comprises covering the surface of the substrate with an aqueous slurry of a powdered mixture comprising the metal oxide of the ceramic substrate, silica and an alkali metal or alkaline-earth metal oxide, the powder mixture having a maximum particle size of about 44 microns, removing excess of slurry, depositing onto the wet surface a layer of granular ceramic material having a particle size of about 250 to about 500 microns, the granular ceramic material being applied in excess relative to the powder of the aqueous slurry to insure that a porous capillary structure will be obtained and causing the slurry to be drawn up between the particles so as to absorb substantially all the slurry, and firing the coated surface at a temperature to effect bonding of the ceramic layer, the powdered constituents of the mixture being proportioned to provide liquid phases at about 200°–300° C above firing temperature. This method finds a particular application in the fabrication of ceramic heat pipes that are made entirely of good dielectric materials and have good heat transfer characteristics with respect to the materials employed.

24 Claims, No Drawings

FABRICATION OF CERAMIC HEAT PIPES

The present invention is concerned with the bonding of ceramics. More particularly, the invention relates to a method of forming a porous capillary layer of a ceramic material onto a ceramic substrate and to the application of this method in the fabrication of ceramic heat pipes.

In nearly all heat transfer applications, it is most desirable to transfer heat with a minimum temperature drop. The results of this objective were greatly improved by the introduction of the "heat pipe" concept more than three decades ago (see R. S. Gaugler, "Heat Transfer Device", U.S. Pat. No. 2,350,348, June 1944). Since then, there have been numerous improvements and applications.

The evaporation and condensation of a single componen fluid with a closed system is a well known thermodynamic process which permits large heat transfer rates with small temperature drops of the fluid. In order to make this process into a continuous closed cycle, the condensate must be transported by some means to the region of evaporation. This could be done with either a mechanical pump or by gravity. In heat pipes, however, the condensate is transported by capillary forces within a suitable porous structure.

Heat pipes are heat transfer devices comprising a well sealed container, a capillary structure and a condensable vapor. The capillary structure is disposed within the containe in such an arrangement so as to cause the flow of the condensed liquid, in conjunction with or without the influence of gravity from a cooler zone of the container to the entire hotter zone where evaporation of the liquid occurs. The vapor is made to flow within the container from the hot evaporator zone to the colder condenser zone by a driving force created by the pressure difference between these two zones. At the colder zone the vapor condenses, thus completing the closed cycle of fluid circulation.

The vapor flow, in effect, transports heat from the heat pipe's hot zone (i.e. the heated end) to its cooler zone (i.e. the cooled end). By the process described, large heat transfer rates can be achieved with small temperature drops. Also, the heat pipe has a distinct advantage of being self contained and not requiring mechanically moving parts for its operation. Such devices can now be purchased in many varities from commercial manufacturers. In addition, many detailed accounts, aspects and limitations of its operation have been published in literature available to the public domain.

The container structure of a heat pipe is most commonly, but not restricted to, a tube or pipe, hence the origin of the name "heat pipe." It can be in any of a variety of materials providing it can satisfactorily withstand the operating temperature and pressure conditions and is chemically inert to the capillary material and working fluid. That is, it must remain gas tight and not cause the generation of noncondensible gases within the heat pipe. Also, there should not be any corrosion, erosion or other break-down that would result in a degradation of the heat pipe's effective thermal conductance. Some typical materials would be copper, aluminum, brass, stainless steel, glass and alumina ceramic.

Working fluids for heat pipes can be chosen from a long list of candidates, the final selection usually being dependent on the desired temperature range of operation, chemical stability with the container and capillary materials and sometimes its dielectric property. Other factors which might be considered are which fluids have the best combinations of transport and thermal properties and the most desirable properties for capillary flow. Some fluids that can be used in heat pipes include, liquid inert gases, liquid metals, hydrocarbons, fluorocarbons, ammonia and water. Those having good dielectric properties include water, acetone, methanol, ethanol, ammonia, freons and a commercial hydrocarbon designated Dowtherm-A by the Dow Chemical Company.

The capillary structure in a heat pipe should be in good thermal contact with the inside surface of the heat pipe container in the evaporator and condenser zones. A poor thermal conductance between the capillary structure and the container results in a high temperature drop between these materials which defeats the purpose of the heat pipe concept. The capillary structure should also provide a suitable combination of capillary pumping capability and resistance to condensate flow. That is to say, it is most desirable to have a maximum pumping ability with a minimum flow resistance.

In tube containers, multi-layered metallic or non metallic cloths are often used for a capillary structure. Other methods include inserts of porous metals or ceramics or metal particles sintered to the container. The disadvantages of the multilayered cloths and inserts are they are difficult to fabricate and install and they offer only modest thermal conductance values, at best, for contact between the capillary structure and the container surface, unless the condensate is a liquid metal. Also, the cloth structures can become distorted by thermal cycling, especially the non metallic cloths, and consequently become ineffective. The sintered metals offer the best conditions for heat transfer between the container and the capillary structure. Even the structure itself has good conductance properties because the particles are bonded together as well as to the container. Even though this is a more desirable capillary structure for heat pipes, it ordinarily requires an expensive process for fabrication, especially if dielectric materials are required.

It is an object of the present invention to provide a method by which particles of a ceramic can be bonded to a substrate made of like or unlike ceramic, in such a way that a porous capillary structure is formed.

It is a further object of the invention to provide such a method which is relatively easy and inexpensive to employ and can be applied to practically any shape of ceramic substrate.

It is yet another object of the invention to provide an inexpensive fabrication of heat pipes that are entirely of good dielectric materials and have good heat transfer characteristics with respect to the materials employed.

In accordance with the invention, there is thus provided a method of forming a porous capillary layer of a metal oxide ceramic material onto a metal oxide ceramic substrate. The method comprises covering the surface of the substrate with an aqueous slurry of a powdered mixture comprising the metal oxide of the ceramic substrate, silica and an alkali metal or alkaline-earth metal oxide, the powdered mixture having a maximum particle size of about 44 microns, removing excess of slurry, depositing onto the wet surface a layer of granular ceramic material having a particle size of about 250 to about 500 microns, the granular ceramic material being applied in excess relative to the powder of the aqueous slurry to insure that a porous capillary structure will be obtained and causing the slurry to be drawn up between the particles so as to absorb substantially all the slurry, and firing the coated surface at a temperature to effect bonding of the ceramic layer, the powdered constituents of the mixture being proportioned to provide liquid phases at about 200°–300° C above the firing temperature.

The Applicants have quite unexpectedly found that the use of a composition containing a metal oxide which is the same as that of the ceramic substrate but in the unfired state, silica and an alkali metal or alkaline-earth metal oxide in proportions to provide liquid phases at about 200°–300° C above the firing temperature is a most efficient and also inexpensive means of bonding ceramics together. Where unlike ceramics are to be bonded, the metal oxide of this composition or mixture is generally selcted to be the same as that of the ceramic substrate rather than that of the particles to be bonded, in order to reduce undue thermal stressing and to avoid weakening the strength of the substrate.

The metal oxides which are employed in the context of the invention all have very high melting points. It is known that, generally speaking, addition of another oxide reduces the melting point. Taking this a step further, addition of a third oxide tends to lower the melting point even further, and so on. Lowering the melting point also implies lowering the temperatures at which the materials will sinter together, i.e. will stick together without actually being raised above their melting point. This occurs because of diffusion of the various atomic species from one particle to a neighbouring particle. This becomes more rapid as the melting temperature is approached. In all cases, then, the addition of $SiO_2$ to the metal oxide reduces the melting temperature, and the addition of the alkali metal or alkaline-earth metal reduces the melting point still further. It therefore suffices to proportion the constituents of the mixture so that localised liquid phases will appear at about 200°–300° C above the firing temperature, thereby resulting in a composition having a very sticky or gluish character at the operating firing temperature. These proportions can be varied widely and be readily determined by anyone of skill in the art upon examination of the phase diagram of the ternary or higher order system under consideration. For example, in the case of alumina bonding, one should examine the $K_2O$-$Al_2O_3$-$SiO_2$ diagram, counting $Na_2O$ as roughly equivalent to $K_2O$. Similar considerations apply for other kinds of metal oxide ceramics, such as magnesia and zirconia. For relevant phase diagrams, reference can be made to "Phase Diagrams for Ceramists" by Ernest M. Levin, Carl R. Robbins and Howard F. McMurdie, The American Ceramic Society, Columbus, Ohio, (1964), as well as its supplements of 1969 and 1975.

It should be pointed out that silica is an essential constituent of the mixture. It provides a better chance for avoiding cracking of the bonds on cooling because the "glue" formed during firing will likely to be glassy in nature and so will not, in fact, have a sharp melting point, but will solidify over a range of temperatures. Since this solidification over a range of temperatures means a gradual increase in viscosity rather than a sharp change from liquid to solid, and fewer stresses are likely to arise, because the "glue" will continue to flow slightly at temperatures considerably below the firing temperature.

Atoms in a solid oscillate about a mean position. When the temperature is sufficiently high, the amplitude of this oscillation may be large enough for an atom to move into the field of another and not return to its original position. A similar process occurs at point contacts when particles of similar or dissimilar materials are held in very close proximity. This diffusion from one particle to another results in bonding between the particles at a sufficiently elevated temperature. In the case of pure materials, e.g. oxides, metals, this temperature is related to but is less than the melting temperature, the amount less being a characteristic of the material and of factors such as applied pressure. In the case of the metal oxides considered here, little or no bonding occurs without high applied pressure at temperatures attainable in readily available furnaces.

In the case of adjacent particles of different materials, bonding will normally occur at a lower temperature than for either of the pure materials. Several mechanisms are involved but one that plays a large part results from the very localised lowering of the melting point that occurs when a few atoms of one material diffuses into the other. This is exactly like the depression of freezing point observed when salt is put in contact with water. Thus, there is localized melting, followed by dissolution of the neighbouring materials, resulting in a region between the two particles with a composition different from either. This may be solid at firing temperature, or it may be liquid, solidifying when the assembly is cooled. In either case, the result is an adhesion of the particles.

In the present case, the substrate and the large oxide particles are coated with the very fine particles of the slurry mixture. Thus, the above type of process will occur between the oxide of the substrate or the large particles and those particles of the slurry mixture that are of a different oxide, as well as between the various oxide particles of the mixture, resulting in an overall adhesion.

It should also be mentioned that the selected particle size of the granular ceramic material together with the provision that there is always an excess of the ceramic particles relative to the particles of the slurry mixture to ensure that a porous and capillary structure will be obtained when firing the coated surface.

For bonding particles to an alumina substrate, an example of a suitable composition for the slurry is the following feldspar: about 18 wt.%
clay: about 71 wt.%
sand: about 11 wt.%

In this mixture, the clay (approximately $Al_2O_3.2SiO_2.2H_2O$) and sand ($SiO_2$) provide most of the $Al_2O_3$ and $SiO_2$ while the feldspar (approximately $K_2O.Al_2O_3.6SiO_2$) also provides the alkali metal oxide which serves to lower the melting temperature of the mixture sufficiently for the particles to become sticky at the firing temperature. Talc can also be added in small amounts to further provide alkaline earth-metal oxides. In addition, nepheline syenite ($4(K, Na)_2O.4Al_2O_3.9SiO_2$) could be used instead of feldspar, but one would need to use less (about 11% instead of 18%) and at the same time a bit more sand (about 18% instead of 11%) because there is a smaller proportion of $SiO_2$ in nephelin syenite than in feldspar. A composition such as that given for use with alumina is, in fact, that of an electrical porcelain in the unfired state. As alumina substrate, use can be made of, for instance, high purity recrystallised alumina, high temperature porcelain or mullite.

Further examples of suitable compositions for the solid component of the slurry can be given. For use with magnesia, the following may be employed:

ground glass: about 11 wt.%
talc: about 89 wt.%

In this case, the talc provides the MgO and $SiO_2$, while the ground glass (bottle or window) provides more $SiO_2$ and some sodium and calcium oxides to reduce the melting point.

In the case of zirconia, it is preferable to use in addition an organic binder, such as gum arabic, to assist in binding the powders together. In the other two examples given above, this was not necessary because, as is well known, clay and the clay-like material talc perform this function themselves. Thus, the following may be employed for zirconia:

chalk or limestone: about 20 wt.%
zircon: about 19 wt.%
sand: about 60 wt.%
gum arabic: about 1 wt.%

The zircon supplies the $ZrO_2$ and some $SiO_2$, and the chalk or limestone provides alkaline-earth metal oxides for lowering the melting temperature. When using such an organic binder, it is preferable to dissolve it in the water to be used for making the slurry before adding the other ingredients. This ensures good distribution of the binder.

It should be emphasized that the solid components of the slurry should be very finely ground, with particles preferably no larger than about 44 microns. The powdered constituent should also be very intimately mixed.

The principal supporting equipment required for the method of the invention is an electric furnace capable of heating the substrate to a temperature of about 1000° to 1400° C, preferably 1200° C, for several hours.

An application of a preferred embodiment of the invention, in the fabrication of ceramic heat pipes, will now be described in detail.

As a first step, the alumina substrate, in this case the inside of an impervious alumina tube of high purity recrystallised alumina, is completely flooded with the slurry of unfired porcelain powder in distilled water, the slurry to consist of 1.5 parts water, more or less, to 1 part powder by weight. After 1 or 2 minutes, the excess is drained off. Then the wet surface is completely covered with the alumina particles by gently sprinkling them on until the particle layer thickness is at least 2 mm. The particles in contact with the wet surface will be attached by a weak adhesion, and some of the porcelain-water slurry will be drawn up between these particles, enabling more particles to become stuck to the already attached particles, and so on. A few minutes after sprinkling on the particles, the unattached particles can be gently shaken off, although this is not necessary. Experience has shown that approximately 0.04 g/cm² of water-powder mixture and approximately 0.25 g/cm² of 400 micron alumina particles will be attached to the surface of the alumina substrate.

The entire assembly after being air-dried is next heated to about 1200° C and kept at that temperature for at least 3 hours. The heatup rate should not be greater than 400° C per hour in order to avoid excessively rapid elimination of water or thermal stressing. The maximum temperature can be as high as 1400° C and the heating time can be as long as 6 hours. During this baking process, diffusion reactions occur between the alumina surfaces and the finely ground porcelain particles coating them, resulting in bonding between the surfaces. Thus, the alumina particles are stuck to the substrate and to each other.

After baking and slow cool-down of the assembly in the furnace, remaining loose particles can be removed. The result will be a porous layer approximately 1 mm thick of 400 micron particles having a density of approximately 0.22 g/cm² of surface area and a porosity of 50 to 60%. If a thicker layer is desired, the water-powder slurry wetting, particle covering and baking processes described in the foregoing can be repeated. The amount of solution required for 400 micron particles will be approximately 0.11 g/cm² and the resulting average layer thickness will be approximately 2 mm. If there should be undesirable nonuniformities in the layer thickness, a suitable tool can be used to remove particles in selected areas.

To fabricate a heat pipe from the ceramic tube and capillary structure assembly, it must be charged with a suitable fluid and its ends sealed. Techniques for accomplishing this are not novel as they have been in practice for many years. End closures for ceramic tubes can be either fabricated or purchased from commercial distributors. Dielectric fluids such as a freon, methanol or Dowtherm A (trademark) can also be readily purchased. Depending on which fluid is chosen, the heat pipe can be operated at temperatures as low as −50° C to as high as 350° C. Such heat pipe is particularly useful in high voltage applications, such as in cooling motors, generators, transformers or rectifiers.

We claim:

1. A method of forming a porous capillary layer of a metal oxide ceramic material onto a metal oxide ceramic substrate, which comprises covering the surface of the substrate with an aqueous slurry of a powdered mixture comprising the metal oxide of the ceramic substrate, silica and an alkali metal or alkaline-earth metal oxide, said powdered mixture having a maximum particle size of about 44 microns, removing excess slurry, depositing onto the wet surface a layer of granular ceramic material having a particle size of about 250 to about 500 microns, said granular ceramic material being applied in excess relative to the powder of the aqueous slurry to insure that a porous capillary structure will be obtained and causing the slurry to be drawn up between the particles so as to absorb substantially all the slurry, and firing the coated surface at a temperature to effect bonding of the ceramic layer, the powdered constituents of said mixture being proportioned to provide liquid phases at about 200°–300° C above the firing temperature.

2. A method as claimed in claim 1, wherein said ceramic material and substrate are selected from the group consisting of ceramics of alumina, magnesia and zirconia.

3. A method as claimed in claim 1, wherein the firing is effected at a temperature between approximatively 1000° and 1400° C.

4. A method as claimed in claim 3, wherein said coated surface is fired at a temperature of approximately 1200° C, over a period of at least 3 hours.

5. A method as claimed in claim 5, wherein said coated surface is heated up to said firing temperature, at a rate of no more than 400° C per hour to avoid excessively rapid elimination of water and thermal stressing.

6. A method as claimed in claim 2, wherein said ceramic substrate comprises alumina.

7. A method as claimed in claim 6, wherein said alumina substrate comprises high purity recrystallised alumina, high temperature porcelain or mullite.

8. A method as claimed in claim 7, wherein said substrate consists of an impervious alumina tube of high purity recrystallized alumina.

9. A method as claimed in claim 6, wherein said mixture comprises feldspar, clay and sand.

10. A method as claimed in claim 9, wherein said mixture comprises about 18 wt.% of feldspar, 71 wt.% of clay and 11 wt.% of sand.

11. A method as claimed in claim 6, wherein said mixture comprises nepheline syenite, clay and sand.

12. A method as claimed in claim 11, wherein said mixture comprises about 11 wt.% of nepheline syenite, 71 wt.% of clay and 18 wt.% of sand.

13. A method as claimed in claim 2, wherein said ceramic substrate comprises magnesia.

14. A method as claimed in claim 13, wherein said mixture comprises ground glass and talc.

15. A method as claimed in claim 14, wherein said mixture comprises about 11 wt.% of ground glass and 89 wt.% of talc.

16. A method as claimed in claim 2, wherein said ceramic substrate comprises zirconia.

17. A method as claimed in claim 16, wherein said mixture comprises chalk or limestone, zircon and sand.

18. A method as claimed in claim 17, wherein said mixture additionally contains an organic binder.

19. A method as claimed in claim 18, wherein said organic binder is gum arabic.

20. A method as claimed in claim 19, wherein said mixture comprises about 20 wt.% of chalk or limestone, 19 wt.% of zircon, 60 wt.% of sand and 1 wt.% of gum arabic.

21. In a process for the fabrication of a ceramic heat pipe comprising a ceramic tube having bonded to the interior surface thereof a sintered, porous ceramic which provides a capillary wick for a working fluid, the improvement which comprises flooding the inside of an alumina tube with an aqueous slurry of unfired porcelain powder, said powder having a maximum particle size of about 44 microns, removing excess slurry, depositing onto the wet surface alumina particles having a particle size of about 250 to 500 microns, said alumina particles being applied in excess relative to the powder of the aqueous slurry to insure that a porous slurry structure will be obtained and causing the slurry to be drawn up between the particles so as to absorb substantially all the slurry, and firing the coated surface at a temperature of at least 1200° C for at least 3 hours to effect bonding between the alumina surfaces, the porcelain constituents being proportioned to provide liquid phases at about 200°–300° C above the firing temperature.

22. A process as claimed in claim 21, wherein said slurry consists of approximately 1.5 parts water to 1 part powder by weight.

23. A process as claimed in claim 21, wherein the alumina particles are sprinkled onto the wet surface until a particle layer thickness of at least 2 mm is obtained.

24. A process as claimed in claim 21, wherein the coated surface is first air-dried and then heated up to about 1200° C, at a heatup rate of no more than 400° C per hour to avoid excessively rapid elimination of water and thermal stressing.

* * * * *